(12) United States Patent
Yonezawa et al.

(10) Patent No.: US 8,364,370 B2
(45) Date of Patent: Jan. 29, 2013

(54) LANE DEPARTURE PREVENTION SYSTEM AND METHOD

(75) Inventors: Takeshi Yonezawa, Odawara (JP); Kou Sato, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 311 days.

(21) Appl. No.: 12/933,537

(22) PCT Filed: Mar. 12, 2009

(86) PCT No.: PCT/IB2009/000502
§ 371 (c)(1),
(2), (4) Date: Sep. 21, 2010

(87) PCT Pub. No.: WO2009/115884
PCT Pub. Date: Sep. 24, 2009

(65) Prior Publication Data
US 2011/0022285 A1   Jan. 27, 2011

(30) Foreign Application Priority Data

Mar. 21, 2008 (JP) ................................. 2008-073508
Nov. 19, 2008 (JP) ................................. 2008-295197

(51) Int. Cl.
*G06F 7/70* (2006.01)

(52) U.S. Cl. ................. 701/70; 701/38; 701/41; 701/80; 701/91; 701/92; 701/116; 701/93; 701/45; 701/301; 340/435; 340/436; 340/903

(58) Field of Classification Search ............... 701/301, 701/80, 38, 41, 91, 92, 116, 158, 93, 45; 340/435, 436, 903
See application file for complete search history.

(56) References Cited

U.S. PATENT DOCUMENTS

| 7,444,224 | B2 * | 10/2008 | Sadano et al. | ............... 701/80 |
| 7,734,416 | B2 * | 6/2010 | Yano et al. | ............... 701/301 |
| 7,949,469 | B2 * | 5/2011 | Hattori et al. | ............... 701/301 |
| 2004/0098187 | A1 * | 5/2004 | Nakao | ............... 701/80 |
| 2004/0193374 | A1 * | 9/2004 | Hac et al. | ............... 701/301 |
| 2005/0096827 | A1 * | 5/2005 | Sadano et al. | ............... 701/70 |
| 2011/0022285 | A1 * | 1/2011 | Yonezawa et al. | ............... 701/70 |

FOREIGN PATENT DOCUMENTS

| JP | 2001-310719 A | 11/2001 |
| JP | 2003-112540 A | 4/2003 |
| JP | 2006-182129 A | 7/2006 |

* cited by examiner

*Primary Examiner* — Redhwan K Mawari
(74) *Attorney, Agent, or Firm* — Foley & Lardner LLP

(57) ABSTRACT

When a target yaw moment Ms is computed, an estimated lateral acceleration $G_H$ and estimated deceleration $G_T$ of a host vehicle are determined beforehand according to target yaw moment Ms, and when the estimated lateral acceleration $G_H$ is smaller than a threshold preset on the basis of the estimated deceleration $G_T$ the target yaw moment Ms is corrected to a smaller limit value Msm.

12 Claims, 5 Drawing Sheets

LANE DEPARTURE PREVENTION SYSTEM AND METHOD

The present application claims priority to Japanese Patent Application No. 2008-073508, filed Mar. 21, 2005, and to Japanese Patent Application No. 2008-295197, filed Nov. 19, 2008, each of which is hereby incorporated by reference in its entirety.

TECHNICAL FIELD

The present invention pertains to lane departure prevention system and method.

BACKGROUND

Japanese Kokai Patent Application No. 2003-112540 discloses a lane departure prevention device in which, when a tendency to depart from the driving lane is detected, a yaw moment is generated by means of braking forces that differ between the left/right wheels, so that the travel path of the host vehicle is corrected in a departure-avoidance direction.

SUMMARY

A lane departure prevention system in an example of the present invention has a detector for detecting a driving lane and a judgment device that determines whether the host vehicle has a tendency to depart from the driving lane detected with the detector. When it is determined by the judgment device there is a departure tendency, a target yaw moment is computed in a departure-avoidance direction, and at the same time, when an estimated lateral acceleration predicted for the host vehicle is smaller than a threshold, which can be provided on the basis of an estimated deceleration predicted for the host vehicle, the computed target yaw moment is corrected by decreasing it. Also, the lane departure prevention system can have a controller that applies different braking forces between the left/right wheels of the host vehicle based on the target yaw moment computed with a yaw moment computing device.

A lane departure prevention system in another example of the present invention has a detection means for detecting a driving lane and a judgment means that determines whether the host vehicle has a tendency to depart from the driving lane detected with the detection means. The system has a yaw moment computing means that works as follows: when it is determined by the judgment means there is a departure tendency, the target yaw moment in a departure-avoidance direction is computed, and at the same time, when the estimated lateral acceleration predicted for the host vehicle is smaller than a threshold, which can be provided on the basis of an estimated deceleration predicted for the host vehicle, the computed target yaw moment is corrected by decreasing it. Also, the system can include a control means that applies braking forces that differ between the left/right wheels of the host vehicle based on the target yaw moment computed with the yaw moment computing means.

In yet another example of the present invention, a lane departure prevention method has the following features: a driving lane is detected; whether the host vehicle has a departure tendency with respect to the driving lane is determined; when it is determined that there is a departure tendency, a target yaw moment in a departure-avoidance direction is computed; when the estimated lateral acceleration predicted for the host vehicle is smaller than a threshold, which can be provided on the basis of an estimated deceleration predicted for the host vehicle, the computed target yaw moment is corrected by decreasing it, and based on the target yaw moment after it has been corrected, different braking forces are applied between the left/right wheels of the host vehicle.

DETAILED DESCRIPTION

In the aforementioned related technology, when a yaw moment is generated due to the difference in braking force between the left/right wheels, in addition to the lateral acceleration, a deceleration (which can generally be a longitudinal acceleration) acts on the vehicle. If the deceleration is greater than the lateral acceleration, the driver feels the deceleration more than the lateral acceleration. Consequently, although control is performed with the purpose of correcting the travel path of the host vehicle (control to prevent lane departure), the driver may misunderstand it to be a vehicle deceleration control.

In the following examples, it will be shown that the scheme involves helping the driver to realize that lane departure prevention control has begun.

In the following, the embodiment of the present invention will be explained with reference to figures.

Figure 1:
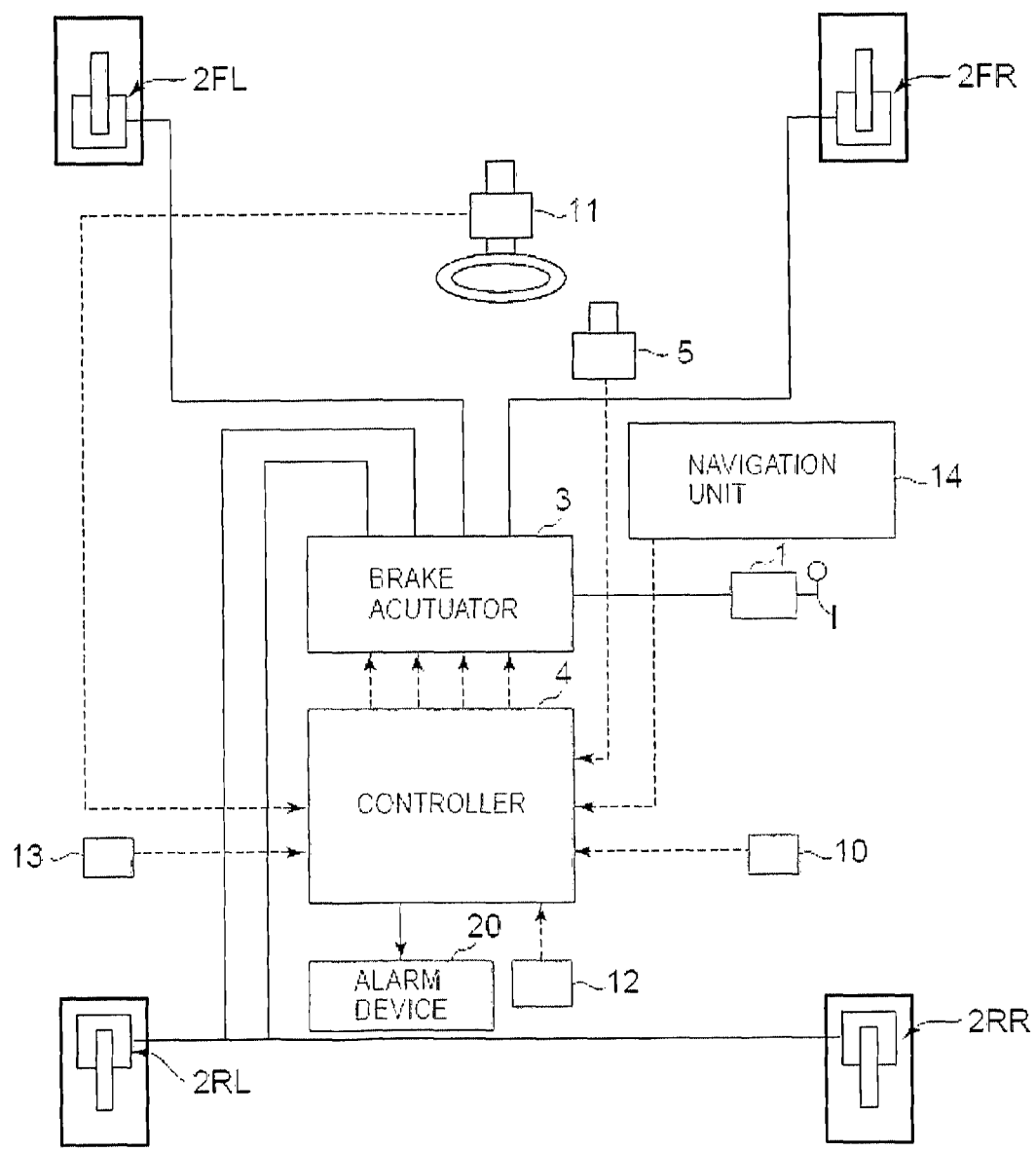
FIG. 1 is a schematic diagram illustrating the lane departure prevention system of the present invention.

FIG. 1 is a schematic diagram illustrating the lane departure prevention system according to the present invention.

Brake actuator 3 for use in vehicle dynamics control (VDC), etc., is located between master cylinder 1 and each of the various wheel cylinders 2i (I=FL, FR, RL, RR). The brake actuator 3 includes a solenoid valve, pump, and other hydraulic devices. Controller 4 controls the driving of the hydraulic devices to control the hydraulic pressure for each wheel cylinder 2i independently of braking operations by the driver.

Also, this system includes a camera 5 for photographing the region ahead of the vehicle. Based on the image data captured by the camera, the image processor within the camera 5 recognizes white lines and other lane markers to detect the driving lane, and at the same time it computes for the host vehicle in the driving lane the yaw angle φ, lateral displacement X from the center of the driving lane, and curvature ρ of the driving lane. The various associated signals generated are input to controller 4. When there is no white line on the road surface the driving lane can also be estimated based on the sides of the road, guardrails, curbs, etc.

Also input to controller 4 are master cylinder pressure Pm detected with pressure sensor 10, steering angle δ detected with steering angle sensor 11, velocity Vwi for each wheel detected with wheel velocity sensor 12, and the operational state of a direction indicating switch 13. Also input to controller 4 are the various types of road information acquired from navigation device 14: longitudinal acceleration Yg of the vehicle, estimated lateral acceleration Xg, and yaw rate φ'.

The various types of data have left/right directionality, with the left direction always taken as positive, while the right direction is taken as negative. That is, the yaw rate φ and steering angle δ are taken as positive when turning left, and as negative when turning right, and the lateral displacement X is taken as positive when deviation from the center of the driving lane is to the left, and negative when the deviation is to the right.

In addition, this system has an alarm device 20. It generates an alarm sound or turns ON an alarm lamp according to an alarm signal output from controller 4.

Figure 2:
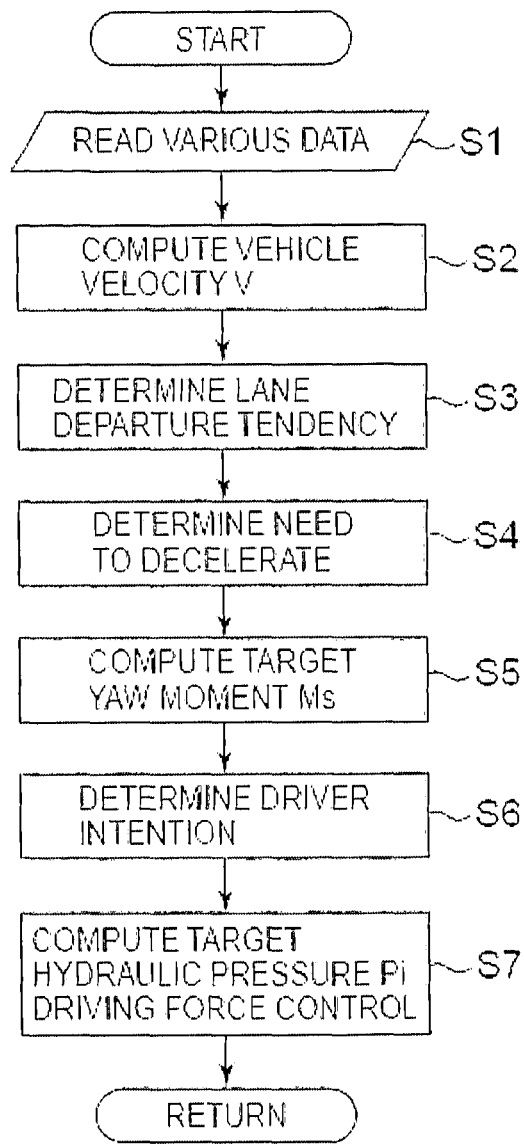
FIG. 2 is a flow chart illustrating lane departure prevention control processing.

In the following first example, arithmetic and logic operations executed by controller 4 according to timer interrupts that occur at prescribed intervals will be explained with reference to the flow chart shown in FIG. 2.

First of all, the various types of data are read in step S1.

Then, in step S2, the average wheel velocity of the non-driving wheels (slave wheels) is computed as vehicle velocity V, as shown below. Also, this can be acquired from the anti-skid control and navigation information, if available.

In the case of a front wheel drive: $V=(Vw_{RL}+Vw_{RR})/2$
In the case of a rear wheel drive: $V=(Vw_{FL}+Vw_{FR})/2$ Then a determination is made as to the departure tendency of the host vehicle with respect to the driving lane in step S3.

First of all, as will be described below, the lateral displacement from the center of the driving lane, after a headway time Tt has elapsed, is computed as estimated lateral displacement Xs. Here the headway time refers to a value obtained by dividing a prescribed distance (look-ahead distance) by vehicle velocity V.

$$Xs = Tt \times V \times (\phi + Tt \times V \times \rho) + X$$

Figure 9:
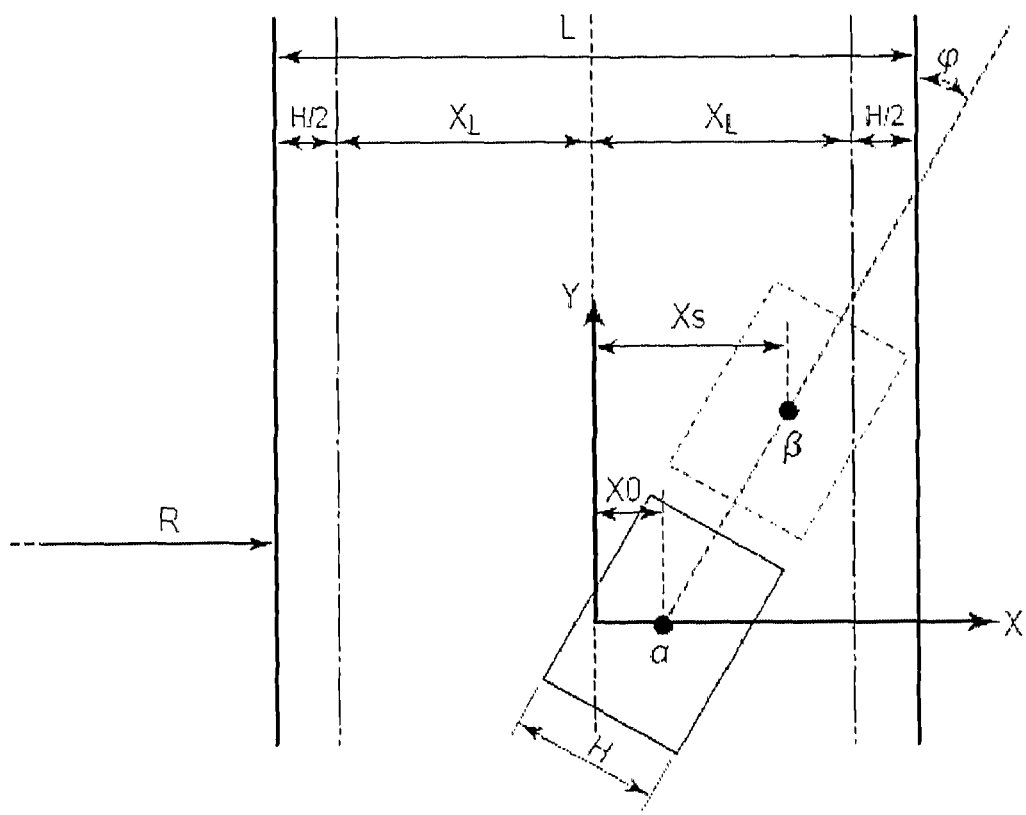
FIG. 9 is a diagram illustrating an amount of lateral displacement from a center of a lane after a headway time.

In FIG. 9, α represents the current position of the host vehicle, and β represents the position of the host vehicle after headway time Tt.

Then, estimated lateral displacement |Xs| is compared to threshold $X_L$. If the comparison result is that $|Xs|<X_L$, it is determined that the host vehicle does not have a lane departure tendency, and the departure flag is reset as Fd=0. On the other hand, when the judgment result is |Xs|≧XL, it is determined that the host vehicle has a departure tendency with respect to the driving lane, and the departure flag is set as Fd=1. In this case, the departure direction can also be detected from the sign (±) of the estimated lateral displacement Xs.

For example, threshold $X_L$ is computed as follows. Here, assume that L represents the width of the lane and H represents the width of the vehicle. Here, lane width L can be acquired from the captured image data or navigation information.

$$X_L = (L-H)/2$$

Then it is determined in step S4 whether deceleration of the host vehicle is needed.

Here it is determined whether the degree of the lane departure tendency of the host vehicle, that is, the difference between estimated lateral displacement Xs and threshold $X_L$, ΔX $(=|Xs|-X_L)$, exceeds a threshold Xa. If the comparison result is ΔX<Xa, it is determined that deceleration of the host vehicle is not needed, and deceleration flag is reset as Fr=0. On the other hand, if the comparison result is ΔX≧Xa, it is determined that deceleration of the host vehicle is needed, and the deceleration flag is set as Fr=1.

Figure 3:
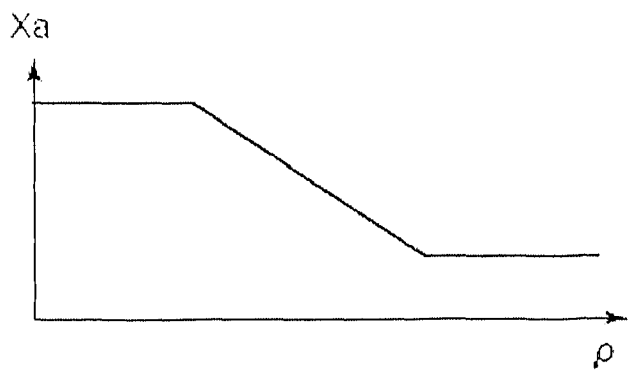
FIG. 3 is a graph for computing threshold Xa.

For example, the threshold Xa can be set to correspond to curvature ρ of the vehicle's travel path with reference to the graph shown in FIG. 3. Generally, the larger the value of curvature ρ, the smaller the threshold Xa.

Then target yaw moment Ms is computed in step S5.

First, when the departure flag Fd=0, Ms=0.

Figure 4:
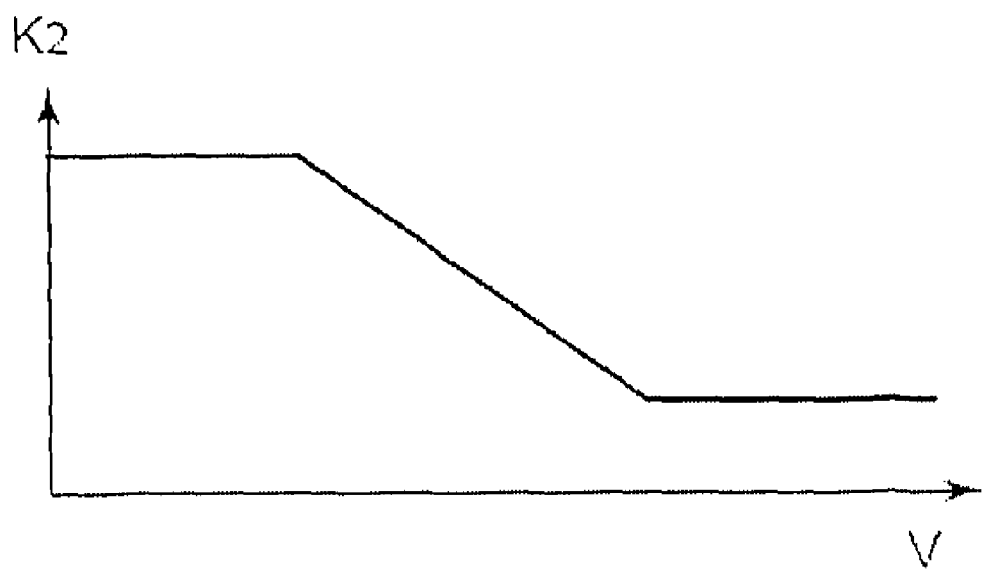
FIG. 4 is a graph for computing gain K2.

On the other hand, when the departure flag Fd=1, computing is performed as follows. Here, K1 represents the gain depending on various vehicle parameters, and K2 represents the gain determined according to vehicle velocity V. Generally, the higher the vehicle velocity V, the smaller the value of K2, as shown in FIG. 4.

$$Ms = K1 \times K2 \times (|Xs|-X_L)$$

That is, the larger the degree of the lane departure tendency $(|Xs|-X_L)$, the larger is the value of target yaw moment M computed.

Estimated lateral acceleration $G_H$ and estimated deceleration $G_T$ generated by target yaw moment Ms are computed as presented below. Here, Ky represents the conversion coefficient of the yaw rate and the yaw moment, and Kg represents the conversion coefficient for the deceleration and the yaw moment.

$$G_H = Ms \times V \times Ky$$

$$G_T = Ms \times Kg$$

In another example, a determination can be made as to whether estimated deceleration $G_T$ is greater than estimated lateral acceleration $G_H$. If the comparison result is $G_H \geq G_T$, it is determined that the driver does not sense deceleration to be more significant than lateral acceleration, and target yaw moment Ms is maintained as is. On the other hand, if the judgment result is $G_H<G_T$, it is determined that the driver senses deceleration to be more significant than lateral acceleration, and as will be described below, target yaw moment Ms is corrected to a value (hereinafter to be referred to as limit value Msm) smaller than the computed target yaw moment Ms (Msm<Ms). That is, when the judgment result is $G_H<G_T$, target yaw moment Ms is corrected by reducing it.

$$Ms = Msm(G_H<G_T)$$

Figure 5:
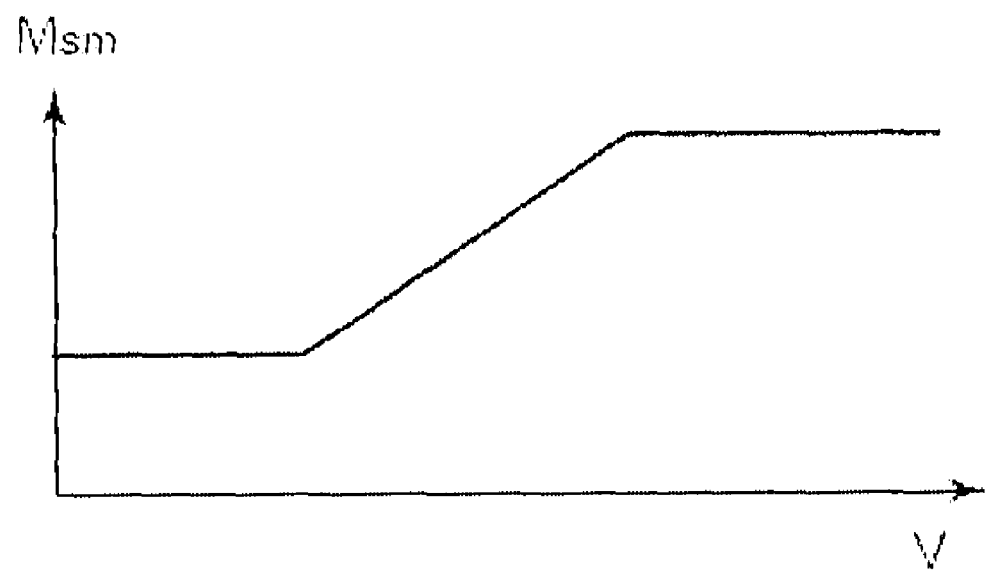
FIG. 5 is a graph for computing limit value Msm.

The limit value Msm is set according to vehicle velocity V with reference to the graph shown in FIG. 5. That is, the lower the vehicle velocity V, the smaller the limit value Msm. This limit value Msm represents the limit for a yaw moment that ensures the driver does not sense deceleration to be more significant than lateral acceleration.

Figure 6:
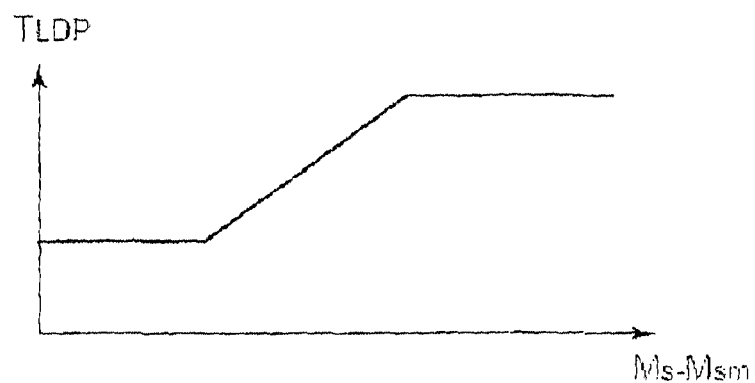
FIG. 6 is a graph for computing control time $T_{LDP}$.

Then, with reference to the graph shown in FIG. 6, a control time $T_{LDP}$ is set according to the difference between Ms and Msm, (Ms–Msm). That is, the larger the difference (Ms–Msm), the longer the control time $T_{LDP}$.

Then the intention of the driver to change lanes is determined in step S6.

First, when the direction indicating switch is ON, a determination is made as to whether the indicated direction matches the departure direction. If YES, it is determined that the driver intends to change lanes, so that the departure flag is reset as Fd=0. On the other hand, if NO, it is determined that the driver does not intend to change lanes, so that the current state of departure flag Fd is maintained.

On the other hand, when the direction indicating switch is OFF, a determination is made as to whether steering angle |θ| exceeds threshold θs. If the judgment result is |θ|≧θs, it is determined that the driver intends to change lanes, and departure flag Fd is reset at 0. If the judgment result is |θ|<θs, it is determined that the driver does not intend to change lanes, and the current state of departure flag Fd is maintained.

Then target hydraulic pressures $P_{FL}$-$P_{RR}$ for the various wheels are computed in step S7.

First, if departure flag Fd=0, it is determined that the host vehicle has no departure tendency, the driving operation of brake actuator 3 is stopped, and the master cylinder pressure shown below is fed to the various wheel cylinders. Here, Pmr represents the rear wheel master cylinder pressure based on ideal distribution of the front/rear braking forces.

$$P_{FL}=P_{FR}=Pm$$

$$P_{RL}=P_{RR}=Pmr$$

Also, if departure flag Fd=1 for the purpose of correcting the travel path in the departure-avoidance direction, braking force differences $\Delta Pf$ and $\Delta Pr$ between the left/right wheels are computed.

First, a determination is made as to whether target yaw moment Ms exceeds a prescribed value Ms1. As shown below, the judgment result is Ms<Ms1, the difference in braking force $\Delta Pf$ between the left/right front wheels and the difference in braking force $\Delta Pr$ between the left/right rear wheels are computed. Here, T represents the tread. For convenience, it is assumed to be the same for the front/rear wheels. Also, KR represents a coefficient for converting braking force to hydraulic pressure at the rear wheels, and it depends on various brake parameters.

$$\Delta Pf=0$$

$$\Delta Pr=2\times KR\times|Ms|/T$$

On the other hand, if the judgment result is Ms≧Ms1 the difference in braking force $\Delta Pf$ between the left/right front wheels and the difference in braking force $\Delta Pr$ between the left/right rear wheels are computed as shown below. Here, KF represents the coefficient for converting braking force to hydraulic pressure at the front wheels, and it depends on various brake parameters.

$$\Delta Pf=2\times KF\times(|Ms|-Ms1)/T$$

$$\Delta Pr=2\times Kr\times Ms1/T$$

Consequently, when the departure direction is to the left, target hydraulic pressures $P_{FL}$-$P_{RR}$ for the various wheel cylinders are computed in order to apply a rightward yaw moment as shown below. On the other hand, when the departure direction is to the right, the left/right should be reversed in order to apply a leftward yaw moment.

$$P_{FL}=Pm$$

$$P_{FR}=Pm+\Delta Pf$$

$$P_{RL}=Pmr$$

$$P_{RR}=Pmr+\Delta Pr$$

Figure 7:
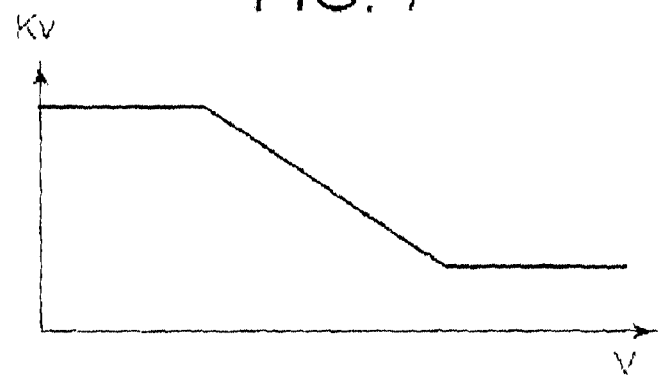
FIG. 7 is a graph for computing gain Kv.

If the deceleration flag Fr=0, the aforementioned target hydraulic pressures $P_{FL}$-$P_{RR}$ are satisfactory. When deceleration flag Fr=1, an additional braking force Pg to perform deceleration is computed as shown below. Here, Kv represents a gain corresponding to the vehicle velocity V. For example, as shown in FIG. 7, in general, the higher the vehicle velocity V, the smaller the value of Kv. Here, Kg is a gain depending on various vehicle parameters.

$$Pg=Kv\times Kg\times(|Xs|-X_L-Xa)$$

Consequently, when deceleration flag Fr=1, target hydraulic pressures $P_{FL}$-$P_{RR}$ for the various wheel cylinders are computed as shown below. Here, Pgr represents an additional rear wheel braking force for the rear wheels based on the ideal distribution of the braking forces to the front/rear wheels.

$$P_{FL}=Pm+(Pg/2)$$

$$P_{FR}=Pm+\Delta Pf+(Pg/2)$$

$$P_{RL}=Pmr+(Pgr/2)$$

$$P_{RR}=Pmr+\Delta Pr+(Pgr/2)$$

Here, brake actuator 3 is controlled to generate target hydraulic pressures $P_{FL}$-$P_{RR}$ in the various wheel cylinders, such as at least one of the left wheels and at least one of the right wheels, and alarm device 20 is turned ON at the same time to alert the driver to the departure tendency of the host vehicle. Then the process flow returns to the prescribed main program.

When deceleration flag Fr=1, a scheme can also be adopted in which not only the braking force alone is increased, but also the engine output power is reduced at the same time so that the driving force is decreased.

The following scheme can also be adopted: when a travel path correction is made in the departure-avoidance direction there is no need to issue an alarm. Instead, a threshold for issuing the alarm and a threshold for correcting the travel path are determined separately with respect to the estimated lateral displacement Xs. In this scheme, the threshold for the alarm is relatively lower so that the alarm is generated before beginning the operation to correct the travel path.

Example of Operation

Now, assume that a departure tendency of the host vehicle to the right is detected, and target yaw moment Ms to the left is computed. When a yaw moment is generated due to a difference in braking force between the left/right wheels, a deceleration (which can generally be a longitudinal acceleration) acts on the vehicle in addition to the lateral acceleration. If the deceleration in this case is greater than the lateral acceleration, although control is performed to correct the travel path of the host vehicle, the driver may feel that the lane deviation control is for the purpose of decelerating the vehicle.

Here, when a target yaw moment Ms is computed, an estimated lateral acceleration $G_H$ and an estimated deceleration $G_T$ acting on the vehicle when the travel path of the host vehicle is corrected are pre-estimated according to the target yaw moment Ms. The lane departure prevention system can then perform comparisons to determine if the generated yaw moment should be corrected to prevent or minimize a feeling by a driver that lane deviation control is performed for the purpose of decelerating the vehicle. For example, such a comparison can be performed by a yaw moment computing device or means of the lane departure prevention system.

For example, the estimated lateral acceleration $G_H$ can be compared to a threshold. Such a threshold can have various values. In another example, the threshold can be determined on the basis of the estimated deceleration $G_T$. In another example, the threshold can be determined by lane departure system or the threshold can have a preset value. In another example, the threshold can have a value the same as the estimated deceleration $G_T$. In any of these examples, when the estimated lateral acceleration $G_H$ is lower than the threshold it is determined that the generated yaw moment should be corrected, such as by decreasing the generated yaw moment, to prevent or minimize a feeling by a driver that lane deviation control is performed for the purpose of decelerating the vehicle.

In another example, the obtained estimates of lateral acceleration $G_H$ and deceleration $G_T$ can be compared with each other. Similarly, the estimated lateral acceleration $G_H$ can be compared to the threshold, which has the same value as the estimated deceleration $G_T$. If the estimated lateral acceleration $G_H$ exceeds the estimated deceleration $G_T$, the driver is not acted upon by a deceleration greater than the lateral acceleration, and the driver can relatively sense the lateral acceleration. Consequently, correction of the travel path is performed by means of a difference in the braking force between the left/right wheels corresponding to the target yaw moment Ms.

Figure 8:
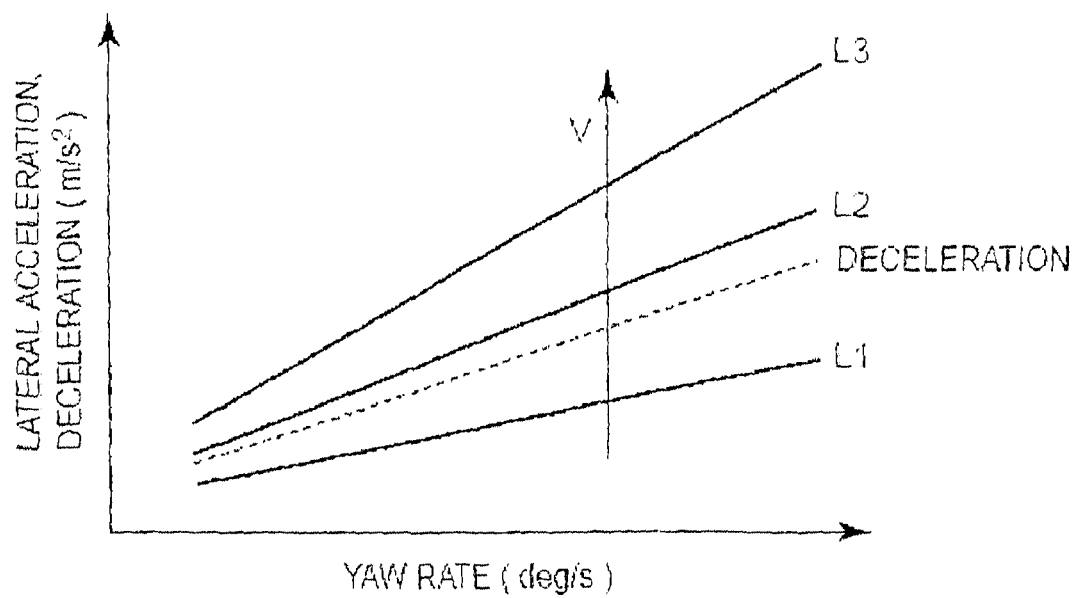
FIG. 8 is a characteristic graph illustrating a variation of an estimated lateral acceleration with respect to a yaw rate for different vehicle velocities.

On the other hand, when the estimated lateral acceleration $G_H$ is smaller than the estimated deceleration $G_T$, or a threshold having the same value as the estimated deceleration $G_T$, the target yaw moment Ms is corrected by decreasing it to a value (limit value Msm) smaller than the computed target yaw moment Ms. As a result, the braking force is reduced for at least one wheel on the side (here, the left wheel side) among the left/right wheels according to the departure-avoidance direction. Here, as shown in FIG. 8, when the lateral acceleration is smaller than the deceleration, the decrease in lateral acceleration and decrease in deceleration when the yaw rate (that is, yaw moment) is decreased causes the decrease in deceleration to be greater. In other words, by decreasing target yaw moment Ms, it is possible to reduce the ratio of deceleration to the lateral acceleration. Consequently, when the travel path of the host vehicle is corrected correspondingly to the target yaw moment Ms that has been corrected by decreasing it to limit value Msm, the driver will easily sense the lateral acceleration, and will easily recognize the onset of departure prevention control. That is, it is possible to prevent the driver from mistaking the control as a control for deceleration.

As has been explained above, when $G_H$ is less than the threshold, or $G_H < G_T$, it is possible by decreasing the target yaw moment Ms to reduce the ratio of the estimated deceleration $G_T$ to the estimated lateral acceleration $G_H$. Here, in order to ensure that the driver senses an actual lateral acceleration, it is preferred for the limit value Msm to have an appropriate value so that the ratio of deceleration to the lateral acceleration is kept smaller than a prescribed ratio. This value varies and depends on the vehicle velocity V. FIG. 8 is a diagram illustrating the relationship between lateral acceleration and deceleration according to the yaw rate. In the figure, solid lines L1, L2, L3 represent lateral acceleration values for a low vehicle velocity (for example, 60 kin/h), medium vehicle velocity (for example, 100 km/h), and high vehicle velocity (for example, 140 km/h), and the broken line indicates the deceleration. That is, for the same yaw rate (that is, yaw moment), the lower the vehicle velocity, the smaller the lateral acceleration, and the larger the ratio of deceleration to the lateral acceleration. In order to suppress an increase in the ratio of deceleration to the lateral acceleration, the limit value Msm must be smaller for a lower vehicle velocity V. By setting a smaller limit value Msm for a lower vehicle velocity V, it is possible to suppress an increase in the ratio of deceleration to lateral acceleration so that the driver can easily sense the actual lateral acceleration.

Also, when the target yaw moment Ms is corrected by decreasing it, there is a corresponding effect on the performance of travel path correction. Consequently, the time required to correct the travel path of the host vehicle is increased in correspondence to the amount of decrease (Ms−Msm) in target yaw moment Ms. That is, once the computed target yaw moment Ms is corrected by decreasing it, the predicted yaw moment applied to the vehicle becomes insufficient. Consequently, this deficiency is offset by prolonging the control time. As a result, the performance of travel path correction is maintained and the vehicle can be reliably returned from its departure tendency.

Additional Examples

In one embodiment, when the judgment result shows that $G_H$ is less than the threshold, or $G_H < G_T$, the target yaw moment Ms is corrected by decreasing it. However, the present invention is not limited to this exemplary scheme. In another example, a scheme can also be adopted so that when $G_H < G_T$ and the difference between estimated deceleration $G_T$ and estimated lateral acceleration $G_H$ exceeds a prescribed value, the target yaw moment Ms is corrected by decreasing it. In this case, the limit value Msm can be set with respect to the target yaw moment Ms at a value such that the difference between estimated deceleration $G_T$ and estimated lateral acceleration $G_H$ is less than a prescribed value. Here, the prescribed value for the difference is a value at which the driver senses deceleration more significantly than lateral acceleration. The prescribed value can be determined by means of experiments, and other methods used in the art.

The following exemplary scheme can also be adopted: when $G_H < G_T$ and the ratio of the estimated deceleration $G_T$ to the estimated lateral acceleration $G_H$ exceeds a prescribed value, the target yaw moment Ms is corrected by decreasing it. In this case, the limit value Msm can be set with respect to target yaw moment Ms at a value such that the ratio of estimated deceleration $G_T$ to estimated lateral acceleration $G_H$ is less than a prescribed value. Here, the prescribed value for the ratio is a value at which the driver senses deceleration more significantly than lateral acceleration, and it can be determined beforehand by means of experiments, and other methods used in the art.

In these schemes, just as in the embodiment, it is preferred that the limit value Msm be set at a smaller value when the vehicle velocity V is low.

The following exemplary scheme can also be adopted: determination of the correction, which involves a decrease, is performed by means of the difference, and the limit value Msm is defined as a ratio. Conversely, determination of the correction involving a decrease can be performed with respect to the ratio, and the limit value Msm can be defined as a difference.

EFFECT

As explained above, the processing performed in step S5 corresponds to processing performed by a "yaw moment computing means", and the processing in step S7 corresponds to processing performed by a "control means".

(1) In the first example, when the lateral acceleration estimated for the host vehicle is smaller than a threshold, the computed target yaw moment is corrected by decreasing it.

As a result, when the travel path of the host vehicle is corrected, the ratio of deceleration to the lateral acceleration can be decreased so that the driver can easily sense the lateral acceleration. Consequently, it is possible to prevent the driver from mistakenly sensing that control is being performed to decelerate the vehicle.

(2) In the example of operation, as the vehicle velocity of the host vehicle decreases, the amount by which the target yaw moment is corrected is increased. In other words, as host vehicle velocity decreases, the target yaw moment is decreased by an increasing amount. Consequently, the driver can easily sense the lateral acceleration.

(3) In an additional example, when the estimated lateral acceleration is lower than the estimated deceleration and the difference between the estimated lateral acceleration and the estimated deceleration exceeds a prescribed value, the target yaw moment is corrected by decreasing it.

As a result, the timing for correcting the target yaw moment by decreasing it can be optimized to match what the driver senses.

(4) In the first example, the target yaw moment can be corrected by decreasing it such that the difference between the estimated lateral acceleration and the estimated deceleration is smaller than a prescribed value.

As a result, it is possible to decrease the ratio of deceleration with respect to the lateral acceleration, allowing the driver to sense the lateral acceleration. Consequently, it is possible to prevent the driver from mistakenly sensing that control is being performed to decelerate the vehicle.

(5) In an additional example, when the estimated lateral acceleration is lower than the estimated deceleration, and the ratio of estimated deceleration to estimated lateral acceleration exceeds a prescribed value set beforehand, the target yaw moment is corrected by decreasing it.

As a result, it is possible for the timing of correcting the target yaw moment by decreasing it to be optimized to match what the driver senses.

(6) In the first example, the target yaw moment can be corrected by decreasing it so that the ratio of the estimated deceleration to the estimated lateral acceleration is smaller than a prescribed value.

As a result, it is possible to decrease the ratio of deceleration to lateral acceleration, and it is possible for the driver to sense the lateral acceleration. Consequently, it is possible to prevent the driver from mistakenly sensing that control is being performed to decelerate the vehicle.

(7) In the example of operation, when the target yaw moment is corrected by the computing device or means to a smaller value, the time allotted for correcting the travel path of the host vehicle can be made longer.

As a result, it is possible to maintain the performance of travel path correction and to reliably recover from the departure tendency.

The process described herein can be performed with a computer. For example, a computer designed for use with a vehicle, such as a computer that is included with or carried by a vehicle, can be used to perform the process described herein. In another example, a vehicle can be provided with a computer having a 80 MHz 32-bit RISC microprocessor to perform the process described herein.

Embodiments of the invention are not limited to the description provided herein. For example, features and components of one embodiment can be used with or substituted for features and components of another embodiment.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lane departure prevention system for a host vehicle, comprising:
a detector configured to detect a driving lane,
a judgment device configured to determine whether there is a departure tendency of the host vehicle from the driving lane detected by said detector,
a yaw moment computing device configured to compute a target yaw moment in a departure-avoidance direction when said judgment device determines that there is a lane departure tendency, wherein the yaw moment computing device is configured to correct said target yaw moment by decreasing the target yaw moment when an estimated lateral acceleration predicted for the host vehicle is lower than a threshold, wherein the threshold is based on an estimated deceleration predicted for the host vehicle, and
a controller configured to apply a different braking force to at least one left wheel and at least one right wheel of the host vehicle based on the target yaw moment computed by said yaw moment computing device.

2. The lane departure prevention system according to claim 1, further comprising a vehicle velocity sensor configured to detect a vehicle velocity of the host vehicle,
wherein said yaw moment computing device is configured to increase an amount said target yaw moment is corrected as the vehicle velocity becomes lower.

3. The lane departure prevention system according to claim 1, wherein said threshold has the same value as said estimated deceleration.

4. The lane departure prevention system according to claim 3, wherein said yaw moment computing device is configured to correct the target yaw moment by decreasing the target yaw moment when said estimated lateral acceleration is lower than said estimated deceleration, and when a difference between said estimated lateral acceleration and said estimated deceleration is larger than a prescribed value.

5. The lane departure prevention system according to claim 4, wherein said yaw moment computing device is configured to correct the target yaw moment by decreasing the target yaw moment such that the difference between the estimated lateral acceleration and said estimated deceleration is smaller than said prescribed value.

6. The lane departure prevention system according to claim 3, wherein said yaw moment computing device is configured to correct said target yaw moment by decreasing the target yaw moment when said estimated lateral acceleration is lower than said estimated deceleration and when a ratio of said estimated deceleration to said estimated lateral acceleration is equal to or larger than a prescribed value.

7. The lane departure prevention system according to claim 6, wherein said yaw moment computing device is configured to correct said target yaw moment by decreasing the target yaw moment such that the ratio of the estimated deceleration to the estimated lateral acceleration is smaller than the prescribed value.

8. The lane departure prevention system according to claim 1, wherein the controller is configured to lengthen a control time, in which the braking force is applied, as said target yaw moment becomes smaller.

9. The lane departure prevention system according to claim 1, wherein the threshold is a preset value.

10. A lane departure prevention system for a host vehicle, comprising:
a detection means for detecting a driving lane,
a judgment means for determining whether there is a departure tendency of the host vehicle from the driving lane detected by said detection means,
a yaw moment computing means for computing a target yaw moment in a departure-avoidance direction when said judgment means determines that there is a lane departure tendency, wherein the yaw moment computing means is configured to correct said target yaw moment by decreasing the target yaw moment when an estimated lateral acceleration predicted for the host vehicle is lower than a threshold, wherein the threshold is based on an estimated deceleration predicted for the host vehicle, and a control means for applying a different braking force to at least one left wheel and at least one right wheel of the host vehicle based on the target yaw moment computed by said yaw moment computing means.

11. A lane departure prevention method for a host vehicle, comprising:

detecting a driving lane;

determining whether the host vehicle has a departure tendency with respect to said driving lane;

computing a target yaw moment in a departure-avoidance direction when there is a departure tendency;

correcting said target yaw moment by decreasing the target yaw moment when an estimated lateral acceleration predicted for the host vehicle is lower than a threshold, wherein the threshold is based on an estimated deceleration predicted for the host vehicle, and applying a different braking force to at least one left wheel and at least one right wheel of the host vehicle based on the target yaw moment.

12. A non-transitory computer readable medium having program code recorded therein that, when executed on a computing system causes the computing system perform steps comprising:

detecting a driving lane;

determining whether the host vehicle has a departure tendency with respect to said driving lane;

computing a target yaw moment in a departure-avoidance direction when there is a departure tendency;

correcting said target yaw moment by decreasing the target yaw moment when an estimated lateral acceleration predicted for the host vehicle is lower than a threshold, wherein the threshold is based on an estimated deceleration predicted for the host vehicle, and applying a different braking force to at least one left wheel and at least one right wheel of the host vehicle based on the target yaw moment.

* * * * *